Nov. 4, 1930.  C. BEARENS  1,780,858
POWER TRANSMISSION
Filed July 28, 1928   2 Sheets-Sheet 1
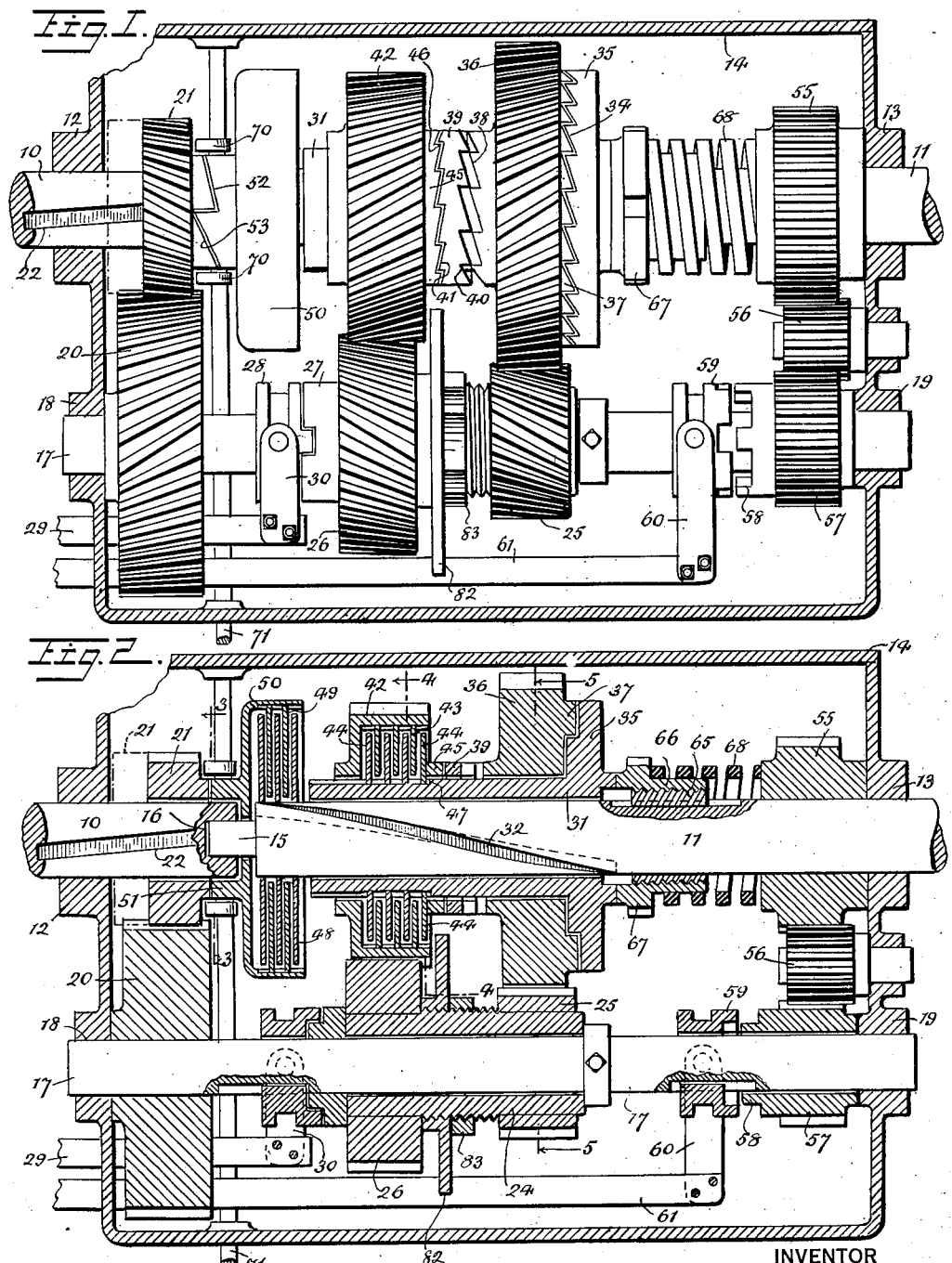
INVENTOR
Claude Bearens.
BY
ATTORNEY
WITNESS
H. T. Walker Nov. 4, 1930. C. BEARENS 1,780,858
POWER TRANSMISSION
Filed July 28, 1928 2 Sheets-Sheet 2
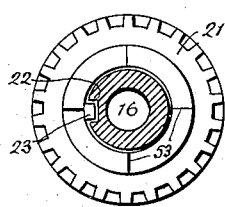
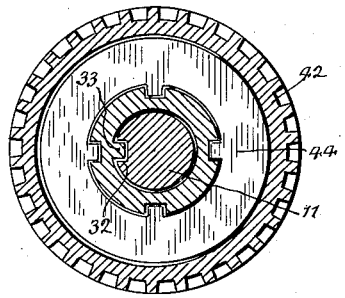
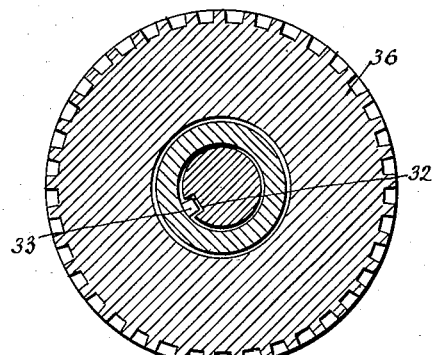
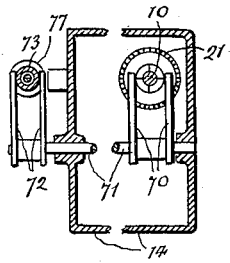
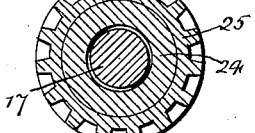
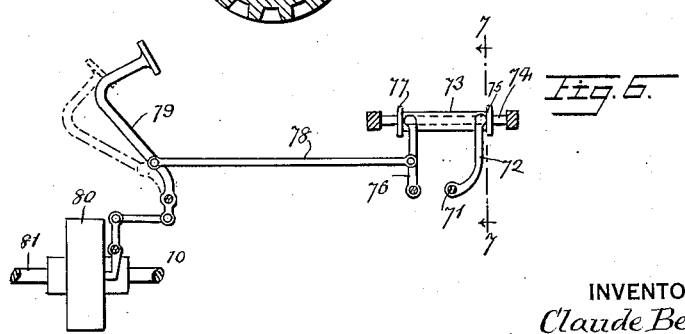
WITNESS
H. T. Walker
INVENTOR
Claude Bearens
BY
ATTORNEY Patented Nov. 4, 1930

1,780,858

UNITED STATES PATENT OFFICE

CLAUDE BEARENS, OF BROOKLYN, NEW YORK

POWER TRANSMISSION

Application filed July 28, 1928. Serial No. 295,996.

This invention relates to power transmissions of the multiple speed selective gear type, the same being in the nature of an improvement upon an automatically operable transmission as set forth in prior United States Letters Patent No. 1,420,514, granted June 20, 1922.

In addition to broadly attaining the objects which resulted from the mechanism set forth in the prior patent above cited, the present invention aims primarily to improve and simplify the mechanism for accomplishing the automatic change of the gear ratio between the driving and driven shafts, in accordance with the variation in the load to which the motor is subjected.

The invention further comprehends a multiple speed selective gear transmission in which the low and intermediate gears on the driven and counter shafts are in constant mesh with means operable by the varying tension upon a spring, in accordance with the load, for gradually effecting an operative and selective connecting or coupling of the driven shaft gears with said shaft, and this without perceptible shock.

More specifically, the invention comprehends in an automatically operable selective gear transmission which includes drive and driven shafts and a direct drive clutch means with intermediate and low speed gearing interposed between the drive and driven shafts and tensioned means for automatically rendering selectively active, the direct drive clutch means or the intermediate and low speed gearing active, multiple disk clutch elements for coupling the intermediate gear and for accomplishing the direct drive whereby in effecting the automatic changing of the gear ratio from low to intermediate and from intermediate to high, said change in the gear ratio may be accomplished in such a gradual and imperceptible manner as to positively preclude jars or shocks to the working parts of the vehicle or the mechanism or the occupants thereof.

Other objects and advantages which are derived from the mechanism constituting the present invention reside in the absorption of shocks in starting, the elimination of the necessity of manually shifting gears to change the gear ratio when ascending a steep grade or when slowing up in traffic; the elimination of wear on the vehicle and an economy in tires, oil and fuel.

Other objects of the invention reside in the comparative simplicity of construction and mode of operation of the transmission, the economy with which it may be produced and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a sectional plan view of a transmission constructed in accordance with the invention and illustrating the arrangement of the parts when the same is in low speed position.

Figure 2 is a complete horizontal sectional view.

Figure 3 is a detail transverse sectional view taken approximately on the line indicated at 3—3 in Figure 2.

Figure 4 is a similar sectional view taken approximately on the line 4—4 of Figure 2.

Figure 5 is a similar view taken approximately on the line indicated at 5—5 in Figure 2.

Figure 6 is a diagrammatic view illustrating the operating connection between the clutch pedal and the transmission.

Figure 7 is a fragmentary transverse sectional view taken approximately on the line 7—7 of Figure 6.

Referring to the drawings by characters of reference, 10 designates the drive shaft and 11 the driven shaft which are journaled in suitable bearings 12 and 13 in the transmission housing 14. The driven shaft is provided with a reduced axially projecting extremity 15 which is journaled in a concentric bearing opening 16 in the inner end of the drive shaft 10. A counter shaft 17 is journaled in bearings 18 and 19 in the transmission housing and said counter shaft has keyed thereto a gear 20 which is of the spiral tooth type and which is constantly in mesh with a gear 21 of the spiral tooth type, which gear 21 is splined to and mounted for limited axial and rotatory movement on the drive shaft 10 through the medium of a spiral keyway 22 and key 23. The counter shaft 17 has loosely mounted thereon a tubular shaft section 24, which tubular shaft section has secured thereto in axially spaced relation low and intermediate gears 25 and 26 of the spiral tooth type. The tubular shaft section is also provided at its forward end with a clutch element 27. A mating clutch element 28 is splined on the counter shaft for axial sliding movement and is suitably controlled by a manually operable lever (not shown) connected through a shift rod 29 to a shifting fork 30.

A sleeve 31 is mounted on the driven shaft 11 and is splined thereto for limited axial and rotatory movement through the medium of a spiral keyway 32 and key 33. The sleeve 31 at its rear end is formed with ratchet shaped clutch teeth 34 on an annular enlarged head 35. A driven low speed gear 36 is loosely mounted on the sleeve adjacent its rear end and said gear is of the spiral tooth type and is in constant mesh with the low speed driving gear on the counter shaft 17. The gear 36 is provided on its rear face with ratchet shaped clutch teeth 37 adapted to mate or interengage with the clutch teeth 34 on the sleeve head 35. The forward face of the gear 36 is provided with ratchet shaped clutch teeth 38 disposed in an opposite direction to the clutch teeth 37. Immediately in advance of the gear 36, an annulus 39 is loosely mounted on the sleeve 31 and said annulus is provided on its rear face with clutch teeth 40 adapted to cooperate with the clutch teeth 38 for a purpose to be hereafter set forth. On its forward face the annulus 39 is provided with ratchet shaped serrations 41 extending in a direction opposite to the clutch teeth 40. Immediately in advance of the annulus 39 and mounted on the sleeve 31 is a driven intermediate speed gear 42 of the spiral tooth type which is in constant mesh with the intermediate speed driving gear 26 on the counter shaft 17. The gear 42 is recessed on its rear face and has keyed therein for axial sliding movement a plurality of disk clutch elements 43. The sleeve 31 is provided at this point with a plurality of friction disk clutch elements 44 keyed thereto for limited sliding movement and alternately spaced between the friction disk clutch elements 43 of the gear 42. The rearmost clutch element 44 has secured thereto a collar 45 which is provided with ratchet shaped serrations 46 adapted to cooperate with the ratchet shaped serrations 41 of the annulus 39. Immediately in rear of the rearmost clutch disk 44, a shoulder 47 is provided which upon forward axial movement of the sleeve 31 is designed to engage with and effect frictional engagement of the clutch elements 43 and 44 to couple the gear 42 with the sleeve. At its forward end the driven shaft 11 has keyed thereto friction disk clutch elements 48 while mating disk clutch elements 49 are keyed in a housing 50 which is loosely mounted or journaled respectively on the driven shaft extension 15. The clutch housing 50 is provided with a forwardly projecting collar 51 which extends forwardly over the rear end of the drive shaft 10 and which is provided with ratchet shaped clutch teeth 52 on its forward face. The gear 21 is provided with mating ratchet shaped clutch teeth 53.

A reverse driven gear 55 is secured to the rear end of the driven shaft 11 and meshes with an idler gear 56 which is supported from the rear end of the transmission housing, which idler gear in turn meshes with a driving reverse gear 57 loosely mounted on the rear end of the counter shaft 17. The gear 57 is provided on its forward face with clutch teeth 58 and a sliding mating clutch element 59 is splined to the counter shaft in advance of the gear 57. A shifting fork 60 carried by a shift rod 61 is employed for axially moving the clutch element 59 to couple the gear 57 with the counter shaft. It is, of course, understood that the shift rod 61 is suitably manually operated, preferably by the same lever which shifts the shift bar 29 for the clutch element 28.

In advance of the gear 55 on the driven shaft 11 is a collar 65 which is keyed to said shaft 11 and which is externally threaded to receive the internally threaded thimble 66 which is provided with an annular rim 67 constituting a spring seat. A coiled expansion spring 68 surrounds the thimble and the driven shaft 11 and is interposed between the spring seat and the gear 55.

A fork 70 straddles the collar 51 and the free terminals thereof engage with the rear face of the gear 21. The fork is secured to a transverse shaft 71 which extends through the side wall of the transmission housing 14 and which is provided with an exteriorly disposed fork 72. The fork 72 has its free terminals straddling a sleeve 73 mounted on a guide 74 externally of the housing 14 and the terminals of said fork are engaged by an annular shoulder 75 on the rear end of the sleeve. A second fork 76 engages an annular shoulder 77 at the forward end of the sleeve 73 and said fork is connected by a connecting bar 78 with the clutch pedal 79 which controls the motor clutch 80, which clutch 80 in turn establishes an operative connection between the motor shaft 81 and the drive shaft 10.

In operation, the clutch pedal 79 is initially thrown out to disconnect the motor and drive shafts and the operator shifts the clutch element 28 into engagement with the clutch element 27. When the clutch pedal 79 is depressed, obviously through the connection heretofore described to the shift fork 70, the gear 21 is moved forwardly so that the clutch teeth 52 and 53 are disengaged. When the operator releases the clutch pedal 79 to permit the clutch 80 to couple the motor shaft 81 and drive shaft 10, motion and power are transmitted through the intermeshing gears 20 and 21 to the counter shaft 17 and through the clutch elements 27 and 28 to the tubular counter shaft section 24, thereby rotating the gears 25 and 26 which in turn transmit motion to the gears 36 and 42. Due to the heavy load to which the motor is subjected in starting and the spiral gearing, the spring 68 will be compressed due to the fact that the sleeve 31 is forced rearwardly by virtue of the spiral splined connection with the driven shaft 11. At the same time, the teeth 40 tend to set up a camming action with the teeth 38 to move the driven shaft low speed gear 36 rearwardly, forcing the clutch teeth 37 into engagement with the clutch teeth 34. The driven shaft is now being driven from the drive shaft through the gearing at a low speed ratio until sufficient momentum is attained to allow the spring 68 to function to move the sleeve 31 forwardly. As the sleeve 31 moves forwardly, the shoulder 47 functions to cause the multiple friction disk plates 43 and 44 to couple the already rotating intermediate speed gear on the driven shaft sleeve 31 with said sleeve, the intermeshing spiral teeth of gears 26 and 42 serving to prevent forward motion of the gear 42 so that the friction disk plates 43 and 44 will frictionally engage with each other. Obviously, this changes the gear ratio without perceptible shock and the drive is now taking place through the intermediate speed gear. Due to the fact that the gear 42 is traveling at a greater rate of speed but in the same direction as the low speed gear 36, lost motion is compensated for by the slippage of the ratchet shaped serrations 46 and 41. As the vehicle attains additional momentum, thereby reducing the load proportionately, the spring 68 function to further advance the sleeve 31 forwardly so that its forward end effects frictional contact of the friction disk clutch plates 48 and 49 for effecting a direct coupling of the drive and driven shafts 10 and 11 to obtain high speed due to the fact that the clutch teeth 52 will have been engaged by the clutch teeth 53 of the gear 21. This engagement will be caused by the camming action of the spiral keyway 22 on the key 23. It is obviously necessary to delay the engagement of the clutch teeth 52 and 53 momentarily when the engine clutch is rendered active in order to prevent a possibility of direct driving connection being established between the drive and driven shafts 10 and 11. However, the delayed return movement of the gear 21 will be sufficient to permit the low speed gear ratio to effect initially a rearward movement of the sleeve 31 so that before the clutch teeth 52 and 53 engage, the friction disk clutch plates 48 and 49 will have become disengaged. In this position, the friction disk clutch plates 43 and 44 become inactive and allow for relative turning movement or lost motion between the gear 42 and the sleeve 31. In ascending a hill or grade, in slowing down the vehicle or in any other manner where the motor is subjected to a heavy pulling load, the operator momentarily throws out the clutch 80 and lets the same in again, with the result that in accordance with the load regulated by the tension of the spring 68, the transmission automatically changes the gear ratio in accordance with the load to be pulled. In order to limit rearward movement of the intermediate speed gear 42, a stop collar 82 is provided on the tubular shaft section 24 and a binding nut 83 functions in connection therewith to hold the same in place. It is also apparent from the construction set forth that the tension of the spring 68 may be regulated by virtue of the threaded connection between the thimble 66 and the collar 65 so as to cause the mechanism to properly function in accordance with the weight of the vehicle.

From the foregoing, it will thus be seen that a transmission has been devised which includes mechanism for accomplishing the automatic change of the gear ratio between the driving and driven shafts in accordance with the variation in the load to which the motor is subjected.

What is claimed is:

1. In a multiple speed selective gear transmission which includes a drive shaft, a driven shaft and a counter shaft having constant operative connection with the drive shaft; a tubular shaft section on the counter shaft having low and intermediate speed gears secured thereto, manually operable means for coupling said tubular shaft section to and uncoupling the same from the counter shaft, a sleeve having a clutch face, mounted on the driven shaft, a spiral splined connection between the sleeve and driven shaft, a low speed gear loosely mounted on said sleeve having a clutch face adapted for engagement with the clutch face of the sleeve for obtaining low speed drive, an intermediate speed gear loosely mounted on said sleeve, a normally inactive multiple disk clutch connection between said intermediate gear and the sleeve adapted when active to obtain an intermediate speed drive, a normally active multiple disk clutch connection between said driven shaft and drive shaft, disk clutch actuating means operable to successively render the multiple disk clutches active upon shifting of the sleeve in one direction and tensioned means operating upon said sleeve to shift the same axially for effecting the selective actuation of the transmission in accordance with the load.

2. In a multiple speed selective gear transmission which includes a drive shaft, a driven shaft and a counter shaft having constant operative connection with the drive shaft; a tubular shaft section on the counter shaft having low and intermediate speed spiral gears secured thereto, manually operable means for coupling said tubular shaft section to and uncoupling the same from the counter shaft, a sleeve on the driven shaft having a clutch face and a spiral splined connection with the driven shaft, a low speed gear loosely mounted on said sleeve having a clutch face adapted for engagement with the clutch face of the sleeve for obtaining low speed drive, an intermediate speed gear loosely mounted on said sleeve, a normally inactive multiple disk clutch connection between said intermediate gear and the sleeve adapted when active to obtain an intermediate speed drive, a normally active multiple disk clutch connection between said driven shaft and drive shaft, said sleeve having independent clutch disk actuating portions operable to successively render the multiple disk clutches active upon axial shifting of the sleeve in one direction, and tensioned means operating upon said sleeve to effect said axial shifting of the same serving to cause the selective actuation of the transmission in accordance with the load.

3. A power transmission including drive and driven shafts, a coupling element interposed therebetween having independently releasable normally active clutch devices connecting the same respectively with the drive and driven shafts to establish a direct high speed driving connection therebetween, gearing interposed between the drive and driven shafts to provide low and intermediate driving connections between said shafts, means adapted to connect the gearing to a drive shaft, means functioning in accordance with the load to selectively cause the gearing connecting means to establish low and intermediate driving connections between the drive and driven shafts, means for releasing one of the coupling element clutch devices, said means which functions in accordance with the load operating to release and maintain released the other coupling element clutch device during low and intermediate speeds while permitting said coupling element clutch device to actively function when the gearing is disconnected from the driven shaft whereby to obtain a direct drive.

4. A power transmission including drive and driven shafts, a coupling element interposed therebetween having independently releasable normally active clutch devices connecting the same respectively with the drive and driven shafts to establish a direct high speed driving connection therebetween, gearing interposed between the drive and driven shafts to provide for low and intermediate driving connections between said shafts, means adapted to connect the gearing to a driven shaft, means including tensioned means functioning in accordance with the load to selectively cause the gearing connecting means to establish low and intermediate driving connections between the drive and driven shafts, means for releasing one of the coupling element clutch devices, said means which function in accordance with the load operating to release and maintain released the other coupling element clutch device during low and intermediate speeds while permitting said coupling element clutch device to actively function when the gearing is disconnected from the driven shaft whereby to obtain a direct drive.

5. A power transmission including drive and driven shafts, a coupling element interposed therebetween having independently releasable normally active clutch devices connecting the same respectively with the drive and driven shafts to establish a direct high speed driving connection therebetween, gearing interposed between the drive and driven shafts to provide low and intermediate driving connections between said shafts, gearing clutch devices adapted to connect the gearing to a driven shaft, means functioning in accordance with the load to selectively cause the gearing clutches to establish low and intermediate driving connections between the drive and driven shafts, means for releasing one of the coupling element clutch devices, said means which functions in accordance with the load operating to release and maintain released the other coupling element clutch device during low and intermediate speeds while permitting said coupling element clutch device to actively function when the gearing is disconnected from the driven shaft whereby to obtain a direct drive, and means for retarding the re-engagement of the released coupling element clutch device.

6. A power transmission including drive and driven shafts, a coupling element interposed therebetween having independently releasable normally active clutch devices connecting the same respectively with the drive and driven shafts to establish a direct high speed driving connection therebetween, gearing interposed between the drive and driven shafts to provide for low and intermediate driving connections between said shafts, gearing clutch devices adapted to connect the gearing to a driven shaft, including tensioned means functioning in accordance with the load to selectively cause the gearing clutches to establish low and intermediate driving connections between the drive and driven shafts, means for releasing one of the coupling element clutch devices, said means which functions in accordance with the load operating to release and maintain released the other coupling element clutch device during low and intermediate speeds while permitting said coupling element clutch device to actively function when the gearing is connected from the driven shaft whereby to obtain a direct drive, means for retarding the re-engagement of the released coupling element clutch device.

7. A power transmission including in combination with an engine, a drive shaft connectable with and disconnectable from the engine shaft by a manually controlled clutch, a driven shaft, a coupling element interposed therebetween having independently releasable normally active clutch devices connecting the same respectively with the drive and driven shafts to establish a direct high speed driving connection therebetween, one of said coupling element clutch devices being simultaneously releasable by and with the engine clutch, means for retarding the re-engagement of said clutch device relative to the re-engagement of the engine clutch, gearing interposed between the drive and driven shafts to provide low and intermediate driving connections between said shafts, gearing clutch devices adapted to connect the gearing to a driven shaft, means functioning in accordance with the load to selectively cause the gearing clutches to establish low and intermediate driving connections between the drive and driven shafts, means for releasing one of the coupling element clutch devices, said means which functions in accordance with the load operating to release and maintain released the other coupling element clutch device during low and intermediate speeds while permitting said coupling element clutch device to actively function when the gearing is disconnected from the driven shaft whereby to obtain a direct drive.

8. A power transmission including in combination with an engine, a drive shaft connectable with and disconnectable from the engine shaft by a manually controlled clutch, a driven shaft, a coupling element interposed between the drive and driven shafts having independently releasable clutch devices normally connecting the coupling element respectively with the drive and driven shafts to establish a direct high speed driving connection therebetween, one of said clutch devices being simultaneously releasable by and with the engine clutch and engageable at an interval after the engine clutch is engaged, gearing interposed between the drive and driven shafts to provide low and intermediate driving connections between said shafts, gearing clutch devices adapted to connect the gear to a driven shaft, means functioning in accordance with the load to selectively cause the gearing clutches to establish low and intermediate driving connections between the drive and driven shafts, means for releasing one of the coupling element clutch devices, said means which functions in accordance with the load operating to release and maintain released the other coupling element clutch device during low and intermediate speeds while permitting said coupling element clutch device to actively function when the gearing is disconnected from the driven shaft whereby to obtain a direct drive.

9. A power transmission including in combination with an engine, a drive shaft connectable with and disconnectable from the engine shaft by a manually controlled clutch, a driven shaft, a coupling element interposed between the drive and driven shafts having independently releasable clutch devices normally connecting the coupling element respectively with the drive and driven shafts to establish a direct high speed driving connection therebetween, one of said clutch devices being simultaneously releasable by and with the engine clutch and engageable at an interval after the engine clutch is engaged, gearing interposed between the drive and driven shafts to provide for low and intermediate driving connections between said shafts, gearing clutch devices adapted to connect the gear to a driven shaft, including tensioning means, means functioning in accordance with the load to selectively cause the gearing clutches to establish low and intermediate driving connections between the drive and driven shafts, means for releasing one of the coupling element clutch devices, said means which functions in accordance with the load operating to release and maintain released the other coupling element clutch device during low and intermediate speeds while permitting said coupling element clutch device to actively function when the gear is disconnected to the driven shaft whereby to obtain a direct drive.

10. In a power transmission, driving and driven members, a coupling element interposed therebetween having independently releasable clutch devices functioning only when both are active to establish a direct driving connection between said drive and driven members and gearing interposed between the drive and driven members to provide low and intermediate driving connections between said members, gearing clutch devices adapted to connect the gearing to a driven member, means functioning in accordance with the load to selectively cause the gearing clutches to establish low and intermediate driving connections between the drive and driven members, means for releasing one of the coupling element clutch devices, said means which functions in accordance with the load operating to release and maintain released the other coupling element clutch device during low and intermediate speeds while permitting said coupling element clutch device to actively function when the gearing is disconnected from the driven member whereby to obtain a direct drive.

11. In a multiple speed selective gear transmission, a drive shaft, a driven shaft, interposed gearing for selectively obtaining different gear ratios, driving connections therebetween, said gearing including constantly meshing intermediate and low speed driven shaft and counter shaft gears and tensioned means for automatically rendering selectively active the intermediate and low gearing in accordance with the load to which the drive shaft is subjected, a coupling element interposed between the drive and driven shafts having independently releasable clutch devices functioning when active in unison to establish a direct high speed driving connection therebetween, means for manually releasing one of said coupling element clutch devices and means operable by the gearing when actively functioning, to release and maintain the other clutch device inactive and to permit said clutch device to become active when the gearing is disconnected from the driven shaft.

12. In a multiple speed selective gear transmission, a drive shaft, a driven shaft, a countershaft, low and intermediate speed gears secured to the countershaft, a member provided with a clutch face having spiral splined connection with the driven shaft, a low speed gear loosely mounted on said member having a clutch face with which the clutch face of the member is engageable for obtaining low speed drive, an intermediate speed gear loosely mounted on said member, a normally inactive clutch connection between said intermediate gear and member adapted when active to obtain an intermediate speed drive, a normally active multiple disk clutch connection between said driven shaft and drive shaft and tensioned means operable to successively render the multiple disk clutches active upon shifting of the member in one direction.

Signed at New York, in the county of New York and State of New York, this 27th day of July, A. D. 1928.

CLAUDE BEARENS.